June 20, 1944.  J. PASTERNACK  2,352,117
JACK
Filed June 3, 1943
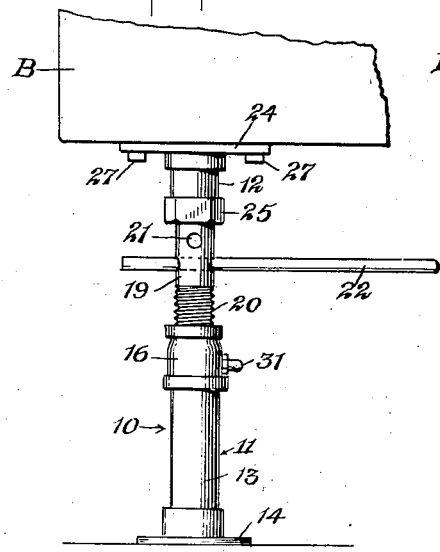
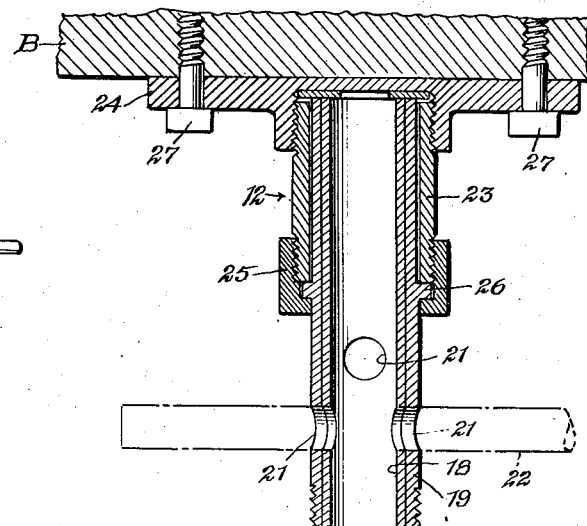
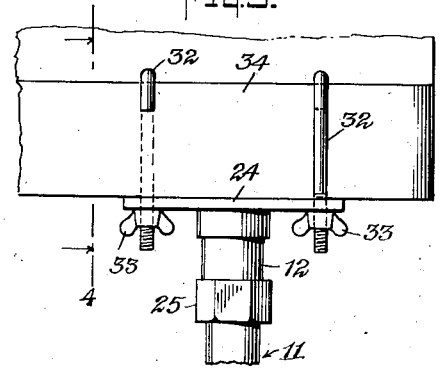
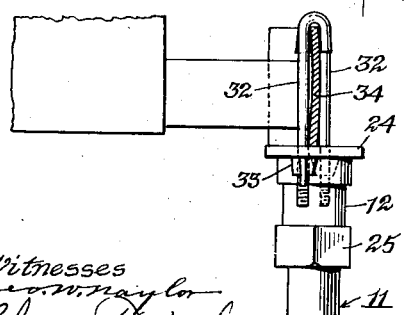
INVENTOR.
Joseph Pasternack
BY
Munn, Liddy & Glaccum
Attorneys
Witnesses
Geo. W. Naylor
Chris Feinle Patented June 20, 1944

2,352,117

UNITED STATES PATENT OFFICE 2,352,117

JACK

Joseph Pasternack, New York, N. Y.

Application June 3, 1943, Serial No. 489,429

6 Claims. (Cl. 254—98)

This invention relates to a mechanical jack.

The present invention contemplates the use of a plurality of jacks embodying improvements, whereby a trailer vehicle or truck may be quickly and easily lifted, kept propped up as long as desired, and then be lowered for use. Also automobiles may be jacked up to be kept in dead storage until wanted as well as for carrying out tire changing and other operations.

An object of the invention is the provision of a jack which is constructed from standard pipe fittings and hardware to the end that the device will be inexpensive of manufacture, strong, of substantial and efficient design, and which requires little preparation and simple adjustments for attaining the desired results.

The nature of the invention and its distinguishing features and advantages will appear when the following description is read in connection with the accompanying drawing, in which Fig. 1 is a side elevation showing a jack embodying the features of the invention in use.

Fig. 2 is an enlarged vertical sectional view through the jack in operative position.

Fig. 3 is a front view showing a modified attaching means for the jack, a portion of which is shown.

Fig. 4 is a sectional view taken on the line 4—4 of Fig. 3.

Referring now more particularly to the drawing, it will be apparent that the jack comprises a standard or prop 10 comprised of two sections, a lower section 11 and an upper section 12. The sections 11 and 12 of the standard are constructed of standard pipe fittings presently to be described.

The lower section 11 consists of a length of pipe 13 having a flange 14 screwed on the lower end thereof, as at 15 to provide a base for the standard. A reducing coupling 16 is screwed on to the upper end of the pipe 13, and said coupling 16 has internal threads 17. Pipes 18 and 19 respectively of suitable length are provided, the pipe 18 tightly fitting within the pipe 19, and said pipes 18 and 19 being substantially co-extensive. The lower half of the pipe 19 is screw-threaded as at 20, the said threads being complimental to the threads 17 of the coupling 16. The pipes 18 and 19 constitute a jack screw which is in telescoping relation with the pipe 13 and in threaded engagement with the coupling 16 so that the lower section 11 of the standard 10 will be extensible and retractible. The upper half of the pipe 19 is plain and has aligned pairs of holes 21, one pair being at right angles to the other pair. These holes accommodate a separate cross bar 22 for rotating the screw.

The upper section 12 of the standard consists of a short length of pipe 23 having a flange 24 screwed on its upper end, and the lower end thereof being threaded to receive a union 25 which cooperates with a collar 26 on the pipe 19 above the holes 21. The upper section 12 of the standard is in the nature of an attachment which may be secured in fixed position on any part of a vehicle such as a trailer-truck or automobile. As shown in Figs. 1 and 2 the flange 24 of the upper section 12 is bolted, as at 27, to the underside of the body of a trailer-truck, a portion of which is shown and designated B. The upper section 12, attached in the manner described, may be allowed to remain attached. The lower section 11 may be readily coupled to the upper section 12 by inserting the upper end of the screw into the pipe 23 after which the union 25 is screwed onto the lower end of the pipe 23 but without contacting the collar 26, although said collar is in contact with the lower end of the pipe 23. The cross bar 22 may then be inserted in a pair of holes 21 to turn the screw until the vehicle or truck is elevated the required distance. The union 25 is then manipulated until it tightly clamps the collar 26 between it and the lower end of the pipe 23. When it is desired to lower the truck, the union 25 is loosened after which the screw may be rotated reversely to retract the standard. It will be appreciated that in carrying out a raising or lowering operation little preparation and simple adjustments are required for attaining the desired results.

It is to be understood that a plurality of similar jack will be used when it is desired to support a trailer-truck in elevated position, or when it is desired to support an automobile elevated to be kept in dead storage. A single jack may be used for carrying out jacking operations when it is desired to change a tire or for any other purpose.

In accordance with another feature of the invention, a plug 28 is screwed in the lower end of the pipe 13 and a plug 29 is screwed in the lower end of the inner pipe 18 of the screw. The outer diameter of the pipe 19 of the screw is smaller than the internal diameter of the pipe 13 to provide a space so that a quantity of oil 30 may be retained in the lower section of the standard for lubricating the screw. A filling plug 31 connected with the coupling 16 serves for introducing the oil into the pipe 13.

A modification of the means for attaching the upper section of the jack is shown in Figs. 3 and 4. This modification is suitable for application to bumpers and consists of hooks 32 which extend through the flange 24. Each hook 32 has a wing-nut 33. The hooks 32 may be reversibly hooked in engagement with a portion of the bumper 34 with the flange 24 in contact with the under side edge of the bumper. By tightening the nuts 33 against the flange 24 the hooks 32 will be drawn tightly in clamping engagement with the bumper to securely hold the upper section 12 of the standard 10 in place to receive the lower section 11 whenever the occasion arises.

From the foregoing, it will be apparent that there has been described a mechanical jack which is simple of construction and operation and capable of being used to attain the objects of the present invention.

I claim:

1. A jack comprising a standard composed of upper and lower sections, cooperative means to detachably connect said sections in line end-to-end, and one of said sections consisting of axially extensible and retractible parts, one of said parts being rotatable and axially movable, and said cooperative means causing the upper section to move exially only upon rotation and axial movement of said rotatable and axially movable part.

2. A jack as set forth in claim 1, wherein said cooperative means consists of a collar on one section, and a union in threaded engagement with the other section and in loose engagement with said collar.

3. A jack comprising a standard composed of an upper section and a lower section, said upper section having means to secure the same in jacking position, cooperative means to detachably connect said sections in line end-to-end, the upper section being shorter than the lower section, and the lower section consisting of axially extensible and retractible parts, one of said parts being rotatable and axially movable, and said cooperative means causing the upper section to move axially only upon rotation and axial movement of said rotatable and axially movable part.

4. A jack including a standard comprising a base, a piece of pipe having its lower end connected with the base, a reducing coupling connected with the upper end of said pipe, a jack screw in telescoping relation with said pipe and in threaded engagement with said coupling, said screw having a smaller external diameter than the internal diameter of said pipe.

5. A jack as set forth in claim 4, and an attachment to loosely receive therein the upper end portion of said screw, said attachment having securing means to rigidly secure it in place, and a means to couple the upper end of the screw to said attachment.

6. A jack including a standard comprising a base, a piece of pipe having its lower end closed and connected with the base, a reducing coupling connected with the upper end of said pipe, a jack screw in telescoping relation with said pipe and in threaded engagement with said coupling, said screw having a smaller external diameter than the internal diameter of said pipe.

JOSEPH PASTERNACK.